United States Patent [19]

Huggins et al.

[11] 4,325,611

[45] Apr. 20, 1982

[54] ELECTROCHROMIC MATERIAL AND ELECTRO-OPTICAL DISPLAY USING SAME

[75] Inventors: Robert A. Huggins, Stanford; Ian D. Raistrick, Menlo Park, both of Calif.

[73] Assignee: Stanford University, Stanford, Calif.

[21] Appl. No.: 106,547

[22] Filed: Dec. 26, 1979

[51] Int. Cl.³ .......................... G02F 1/17; G02F 1/23; C09K 3/00
[52] U.S. Cl. .................................... 350/357; 252/408; 252/518; 252/519; 252/520; 252/521; 252/600
[58] Field of Search ................ 350/357; 252/408, 600, 252/518, 520, 521, 519

[56] References Cited

U.S. PATENT DOCUMENTS

| | | | |
|---|---|---|---|
| 3,971,624 | 7/1976 | Bruesch et al. | 252/408 EC |
| 4,013,343 | 3/1977 | Jaccard et al. | 252/408 EC |
| 4,110,015 | 8/1978 | Reddy | 252/408 EC |
| 4,110,259 | 8/1978 | Sichel | 350/357 |
| 4,116,546 | 9/1978 | Leibowitz | 350/357 |
| 4,150,879 | 4/1979 | Bayard | 350/357 |
| 4,163,982 | 8/1979 | Domenico, Jr. et al. | 350/357 |
| 4,225,216 | 9/1980 | Boyd et al. | 252/408 EC |
| 4,236,792 | 12/1980 | Bissar | 350/357 |

FOREIGN PATENT DOCUMENTS

| | | | |
|---|---|---|---|
| 2618079 | 10/1977 | Fed. Rep. of Germany | 252/408 |
| 2923369 | 12/1979 | Fed. Rep. of Germany | 252/408 |
| 2023867 | 1/1980 | United Kingdom | 350/357 |

OTHER PUBLICATIONS

Hagenmuller, P.; "Non-Stoichiometric Compounds: Tungsten Bronzes, Vanadium Bronzes, and Related Compounds", Percamon International Library, New York, N.Y., pp. 552-553, (1973).
Brimm, E. O. et al., JACS, vol. 73, pp. 5427-5432, (Nov. 1951).
Schirmer, O. F. et al., J. Electrochem. Soc., vol. 124, No. 5, pp. 749-753, (May 1977).
Scott, B. A. et al., IBM Tech. Discl. Bull., vol. 20, No. 3, pp. 1223-1225, (Aug. 1977).

*Primary Examiner*—Teddy S. Gron
*Attorney, Agent, or Firm*—Flehr, Hohbach, Test

[57] ABSTRACT

Electrochromic material for an electro-optic display includes an oxide of at least one transition metal having a structure related to a hexagonal tungsten bronze structure whereby ions of an electro-active material readily diffuse through the lattice structure. In a display the electrochromic material is positioned between two electrodes with an electrolyte between and contacting the electrochromic material and one electrode which comprises the electro-active material.

12 Claims, 3 Drawing Figures

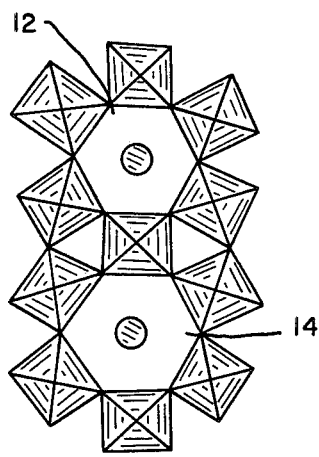
FIG.—1
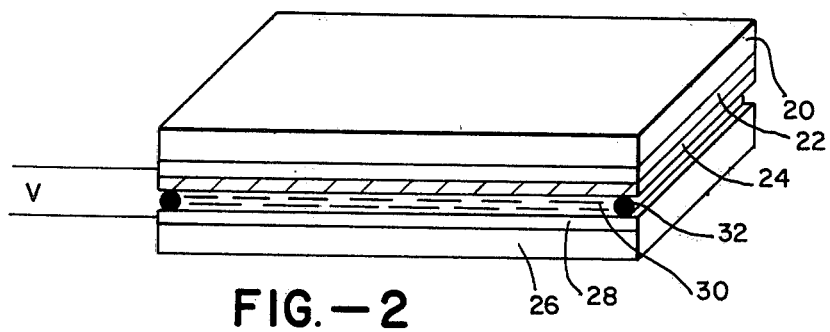
FIG.—2
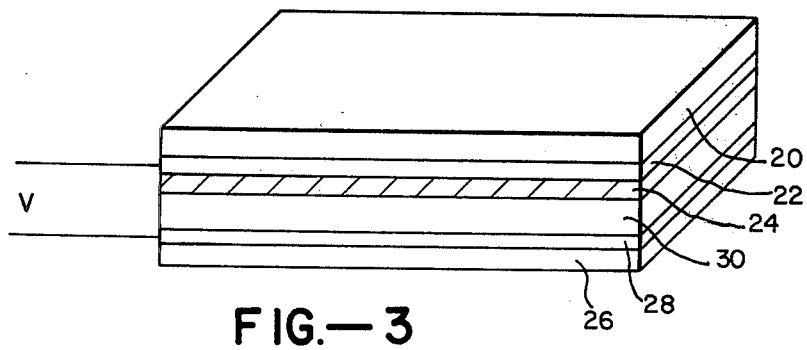
FIG.—3

ELECTROCHROMIC MATERIAL AND ELECTRO-OPTICAL DISPLAY USING SAME

This invention relates generally to electro-optical devices, and more particularly the invention relates to electro-optical devices which utilize electrochromic material.

Conventional commercially available electro-optical displays comprise light emitting diodes or liquid crystal systems. However, these displays have inherent limitations which affect their utility. For example, light emitting diodes require appreciable electric power for operation and are typically utilized for intermittent display. Liquid crystal devices offer a continuous readout but have only a moderate optical contrast, a limited viewing angle, and limited life.

Developmental efforts are presently being undertaken on electro-optical displays which utilize electrochromic materials. An electrochromic material has the ability to change optical properties in response to the diffusion of ions into or out of the bulk electrochromic material. Most efforts to date have concentrated on electrochromic systems using amorphous tungsten oxide ($WO_3$) with hydrogen ions as the diffusant. By providing an acid liquid electrolyte or other proton-conducting electrolyte in contact with the tungsten oxide material and by appropriate voltage biasing of the tungsten oxide, hydrogen ions or protons will diffuse into the electrochromic material with their charge being balanced by additional electrons, forming colored $H_xWO_3$ material. By reversing the voltage bias, the protons diffuse out of the electrochromic material, which then returns to its original color.

Limitations of presently known electrochromic devices include long response time due to the slow diffusion of ions into and out of the electrochromic material. Such devices also degrade with time, the general experience being that efforts to reduce the response time tend to increase the rate of degradation.

Accordingly, an object of the present invention is an improved electrochromic display.

Another object of the invention is an electrochromic display having improved response time.

Still another object of the invention is an improvement in useful lifetime of an electrochromic display.

Yet another object of the invention is an electrochromic display having a solid electrolyte.

Briefly, an electro-optic device in accordance with the present invention consists of multi-layer configuration of the following components:

First, an optically transparent substrate is provided with an optically transparent, electronically conducting electrode. In contact with the electronically conducting electrode is the electrochromic material, comprising an oxide of one or more transition metals, which has a crystal structure related to that of the hexagonal tungsten bronze family.

In contact with the electrochromic material is an electrolyte, which separates the electrochromic material from a second electrode containing the electroactive species. The second electrode is supported or covered by a layer which provides electrical contact to the second electrode.

Importantly, this type of hexagonal crystal structure provides tunnels in the electrochromic material in which ions can reside and rapidly travel. By appropriately electrically biasing the electrodes on the first and second substrates, ions from the second electrode are transmitted through the electolyte and diffuse into the tunnels of the electrochromic material, thereby changing its optical properties. By changing the voltage bias, the ions diffuse out of the material through the electrolyte back toward the second electrode.

In accordance with a preferred embodiment, the electrochromic material comprises potassium tungsten oxide having the composition

$$K_xWO_{3+y}$$

where $0.27 \leq x \leq 0.33$
and $y = x/2$

In accordance with another feature of the invention the second electrode comprises a metal which changes the optical properties of the electrochromic material when diffused therein and the electrolyte is a conductor of ions of this metal. In preferred embodiments the electrode comprises lithium and the electrolyte is a solid which conducts lithium ions.

The invention and objects and features thereof will be more readily apparent from the following detailed description and appended claims when taken with the drawing, in which:

FIG. 1 is a plan view of the crystal structure of the electrochromic material used in the electro-optical device of the present invention.

FIG. 2 is a section view of one embodiment of the present invention utilizing a liquid electrolyte.

FIG. 3 is a section view of another embodiment of the invention which utilizes a solid electrolyte.

Referring now to the drawings, FIG. 1 is a plan view illustrating the hexagonal crystal structure of the electrochromic material used in the electro-optical device of the present invention. The lattice structure, which is the hexagonal tungsten bronze structure, comprises oxides of transitional metals with species such as potassium, cesium, rubidium, strontium, barium, indium, thallium, and tin residing in the tunnel space. In addition, oxygen or other anionic species may be present in the tunnels. Importantly, the hexagonal lattice structure defines a plurality of tunnels 12, 14, as well as smaller parallel and cross tunnels in which ions can readily migrate in response to an appropriate electrical or chemical driving force. It has been discovered that in such structures, some ions, e.g. lithium, have a diffusion coefficient on the order of $10^{-7}$ to $10^{-8}$ square centimeters per second or higher, which is several orders of magnitude higher than the comparable diffusion coefficient in electrochromic structures heretofore known. While the conventional electrochromic display has a response time in the order of 1/10 second to a number of seconds, the response time of a display in accordance with the present invention is considerably shorter.

FIGS. 2 and 3 are section views of two embodiments of an electro-optical display in accordance with the present invention. Because of the similarity of the two structures the same reference numerals will be used for like elements. The major difference in the structure of the two displays is the necessity for a seal in the display in FIG. 1 to contain a liquid electrolyte, whereas the electrolyte in the embodiment of FIG. 3 is solid. In the two embodiments a transparent substrate 20 such as glass is provided with a transparent electrical conductor 22 such as tin oxide or indium tin oxide. Formed on the transparent film 22 is a thin layer of electrochromic material 24. A second supporting layer 26 is provided in spaced parallel alignment with the substrate 20 with a conductive counterelectrode 28 provided on the surface of this layer 26 facing substrate 20. The space between the layer 26 and the substrate 20 is filled by an electrolyte 30. In FIG. 2 the electrolyte is a liquid and accordingly seal 32 is provided around the periphery of the electrolyte to confine the liquid electrolyte 30 therein.

In operation, an electrical potential is established across the two electrodes 22, 28 by applying a voltage to the electrodes through suitable contacts. Below a first potential difference ions flow from the second electrode through the electrolyte to the electrochromic material and alter the optical properties thereof. Above the first potential difference the ions diffuse out of the electrochromic material and return to the second electrode, thereby reversing one change in the optical properties of the electrochromic material.

The electrochromic material is an oxide of transition metals having a crystal structure related to those of the hexagonal tungsten bronze family, with such metals as potassium, cesium, rubidium, strontium, barium, thallium, indium and tin, and sometimes oxygen or other anionic species within the tunnels. In a preferred embodiment using potassium, the structure is defined by the equation $$K_xWO_{3+y}$$

where $0.27 \leq x \leq 0.33$
and $y = x/2$

Alternatively, the hexagonal tungsten bronze type of oxide structure may be based upon the pseudo-binary system molybdenum trioxide-tungsten trioxide where the tungsten to molybdenum ratio is either 11 or 14. Further, the tungsten may be wholly or partially replaced by another transition element, as for example:

$$Tl_xNb_xW_{1-x}O_3 \text{ (where } 0.2 \leq x \leq 0.33)$$

$$Tl_xTa_xW_{1-x}O_3 \text{ } (0.26 \leq x \leq 0.33)$$

The ions for diffusing into the electrochromic material may be lithium, hydrogen, sodium, potassium, copper or silver.

With lithium as the diffused ion, the electrode 28 on the supporting layer 26 may comprise a layer of lithium having a thickness of at least 50 angstroms. Alternatively, the counterelectrode may be an alloy or compound of lithium such as lithium-aluminum or a ternary lithium oxide which are electronic conductors and from which lithium ions can be easily removed and redeposited.

The operating voltage of the electro-optical device will depend on the lithium chemical potential in the counter electrode, and this may be adjusted by the selection of the counter electrode material.

A liquid electrolyte can contain any of a variety of lithium salts such as $LiAsF_6$ or $LiClO_4$ dissolved in an organic solvent such as propylene carbonate, tetrahydrofuran, dioxalane, $\gamma$-butyrolactone or 2-methyl tetrahydrofuran.

A solid electrolyte for lithium ions may comprise a ceramic material such as lithium phosphate doped lithium silicate, lithium-beta-alumina; a polymeric material such as polyethylene oxide or polypropylene oxide containing dissolved lithium salts such as $LiClO_4$; glasses such as lithium silicates containing dissolved lithium salts such as $Li_2SO_4$4; or simple compounds of lithium which behave as electrolytes such as $LiI$, $Li_3N$, $Li_2NH$, and variants thereof.

EXAMPLE 1

Liquid Electrolyte Device

In constructing a liquid electrolyte device as illustrated in FIG. 2, a lithium metal counterelectrode is prepared by evaporation of lithium onto an electrically conducting substrate such as aluminum. The layer of lithium has a thickness of at least 50 angstroms. An electrochromic film, $K_xWO_{3+y}$, is formed on a glass substrate having a tin oxide conductor film thereon. The thin film of electrochromic material is prepared by vacuum evaporation from a powder which is contained in a tantalum boat. The boat is heated to 1,000°–1,200° C., with the substrate-source distance about 25 centimeters. Pressure of the evaporation chamber is $5 \times 10^{-5}$ to $5 \times 10^{-6}$ Torr. The powder material is prepared by conventional solid state reaction from $K_2WO_4/WO_3$ or $K_2CO_3/WO_3$ mixtures. Alternatively, the thin film can be prepared by sputtering from a target of the material. Thickness of the electrochromic film is 1,000 Angstroms. Thickness can vary between 500–50,000 Angstroms.

EXAMPLE 2

In an example utilizing a solid electrolyte a counterelectrode of lithium metal was evaporated onto an electrically conducting substrate such as aluminum, as in Example 1. The electrolyte was a thin disc of lithium phosphate doped lithium silicate on which the electrochromic material, $K_{0.3}WO_{3.15}$, was deposited, as in Example 1.

The counterelectrode determines the voltage at which the device is operated. For a pure lithium counterelectrode the electrochromic material colors below +2 volts differential and bleaches or loses color above +3 volts differential. The electrolyte allows the passage of metallic ions from the counterelectrode, which acts as a source of the metallic species, to the electrochromic material during coloration, or in the opposite direction during bleaching. The ion current flow is controlled by changing the potential difference between the two electrodes of the cell. The intensity of coloration of the electrochromic material depends on the total charge passed through the cell, and the rate of coloration depends on the current which is passed. This current is limited by the diffusion coefficient of the metallic species in the electrochromic material, and the diffusion coefficient of lithium is on the order of $10^{-7}$ to $10^{-8}$ square centimeter per second, as above indicated.

An electro-optical device using electrochromic material in accordance with the present invention not only has a very high diffusion coefficient but the material behaves thermaldynamically as a single phase over the whole range of lithium composition and offers high reversibility and long device lifetime. Further, the material has a high electrical conductivity when colored.

While the invention has been described with reference to specific embodiments, numerous variations have been suggested. Thus, embodiments described herein are illustrative of the invention and are not to be construed as limiting the invention. Various modifications and applications may occur to those skilled in the art without departing from the true spirit and scope of the invention as defined by the appended claims.

What is claimed is:

1. An electro-optical device comprising
an optically transparent substrate,
an optically transparent electrode formed on a surface of said substrate,
a second electrode in spaced alignment with said optically transparent electrode, said second electrode comprising an electro-active material,
an electrochromic material supported by said substrate and positioned between said electrodes, said electrochromic material comprising an oxide of at least one transition metal having the hexagonal tungsten bronze crystal structure,
an electrolyte between and contacting said electrochromic material and said second electrode, said electrolyte being conductive of ions of said electroactive material between said second electrode and the crystal structure of said electrochromic material, and
an ionic species in said crystal structure of said electrochromic material whereby said electrochromic material changes color when ions of said electroactive material are in said crystal structure.

2. An electro-optical device as defined in claim 1, wherein said electrochromic materials comprises an oxide of at least one of the transition metals chosen from the group tungsten, molybdenum, niobium, tantalum, vanadium, titanium or zirconium.

3. An electro-optical device as defined by claims 1 or 2 wherein said electrochromic material further includes at least one metal cationic species selected from the group consisting of potassium, cesium, rubidium, strontium, barium, indium, thallium and tin within crystallographic tunnels of the hexagonal structure.

4. An electro-optical device as defined by claim 3 wherein said electrochromic material further includes an anionic species within crystallographic tunnels of the hexagonal structure.

5. An electro-optical device as defined by claim 4 wherein said anionic species comprises oxygen.

6. An electro-optical device as defined by claim 1 wherein said electrochromic material comprises potassium tungsten bronze having the composition $$K_xWO_{3+y}$$

where $0.27 \leq x \leq 0.33$
and $y = x/2$.

7. An electro-optical device as defined by claim 1 wherein said electroactive species comprises an element selected from the group consisting of lithium, hydrogen, sodium, potassium, copper and silver.

8. An electro-optical device as defined by claim 1 or 6 wherein said second electrode comprises lithium.

9. An electro-optical device as defined by claim 1 or 6 wherein said second electrode comprises a lithium alloy.

10. An electro-optical device as defined by claim 1 or 6 wherein said second electrode comprises a lithium compound.

11. An electro-optical device as defined by claim 1 wherein said electrolyte comprises a lithium salt dissolved in an organic solvent.

12. An electro-optical device as defined by claim 1 wherein said electrolyte comprises a solid material selected from the group consisting of lithium based ceramics, polymeric materials including dissolved lithium salts, lithium based glasses, and ionically conducting lithium compounds.

* * * * *